United States Patent [19]

Brunfeld

[11] Patent Number: 5,189,489
[45] Date of Patent: Feb. 23, 1993

[54] INTERFEROMETRIC MEASUREMENT DEVICE WITH NON STABILIZED LIGHT SOURCE

[75] Inventor: Andrei Brunfeld, Bat-Yam, Israel

[73] Assignee: Amsys Ltd., Jerusalem, Israel

[21] Appl. No.: 699,675

[22] Filed: May 14, 1991

[30] Foreign Application Priority Data

May 17, 1990 [IL]  Israel ........................................ 94429

[51] Int. Cl.$^5$ ............................................ G01B 11/02
[52] U.S. Cl. ..................................... 356/358; 356/360
[58] Field of Search ................. 356/358, 359, 360, 349, 356/351

[56] References Cited

U.S. PATENT DOCUMENTS 4,973,153  11/1990  Yokokura et al. .................. 356/358

Primary Examiner—Samuel A. Turner
Assistant Examiner—LaCharles P. Keesee
Attorney, Agent, or Firm—Edwin D. Schindler

[57] ABSTRACT

The present invention relates to a method for greatly extending the effective coherence length of non-stabilized lasers allowing one to use them in interferometers with large optical path differences. The embodiment described as an example comprises a robust Twyman-Green interferometer for accurate measurement of extended displacements.

12 Claims, 8 Drawing Sheets

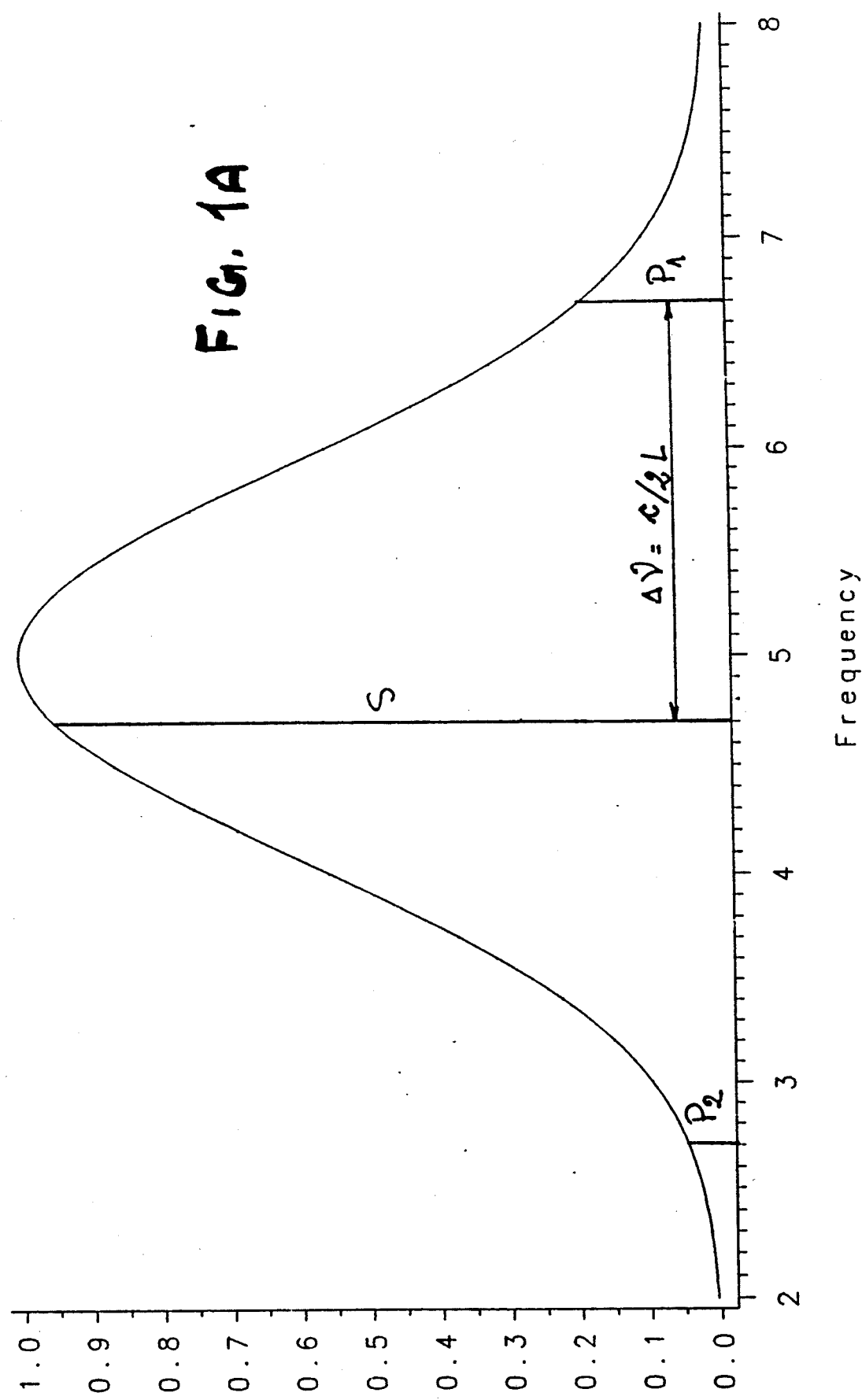

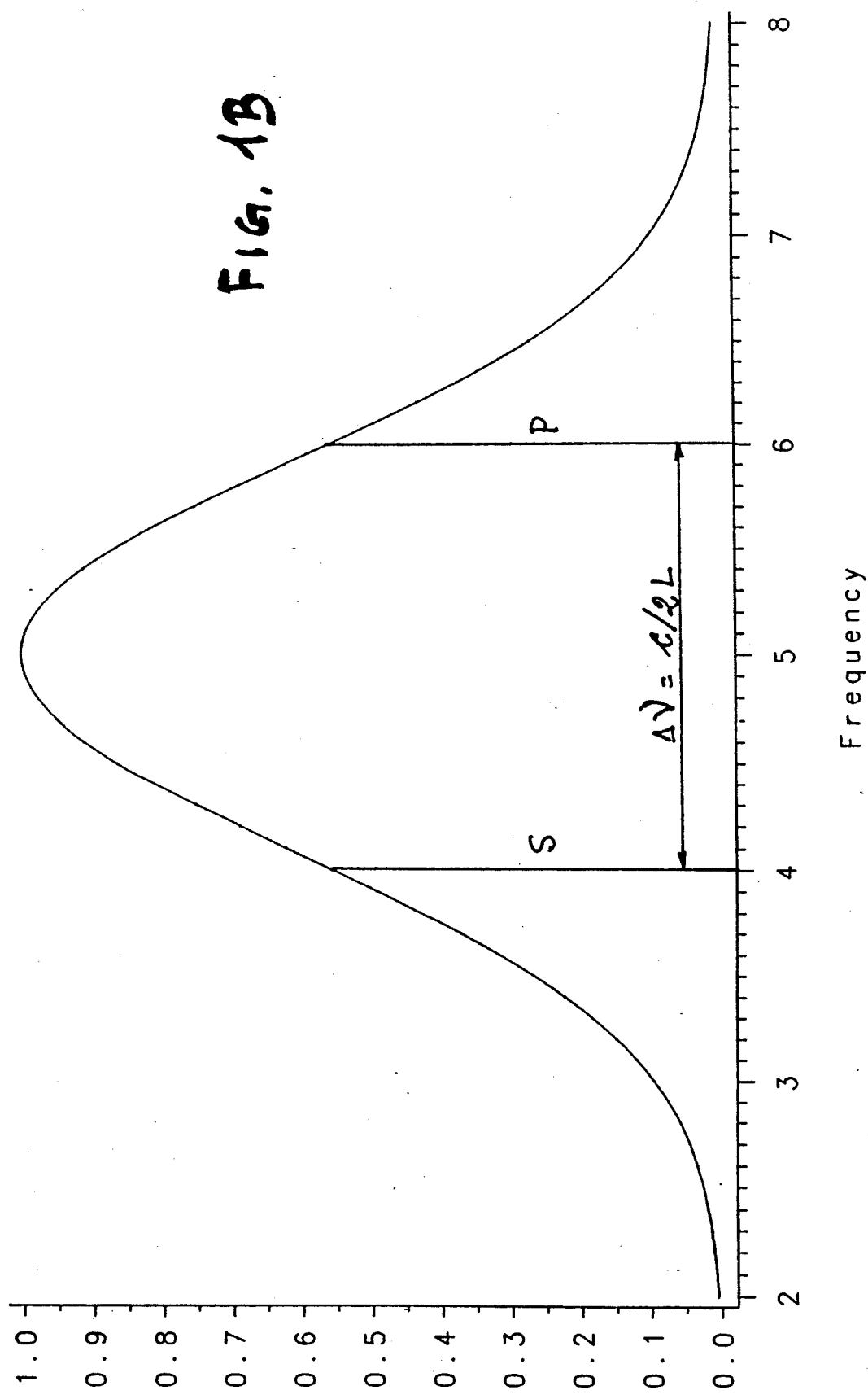

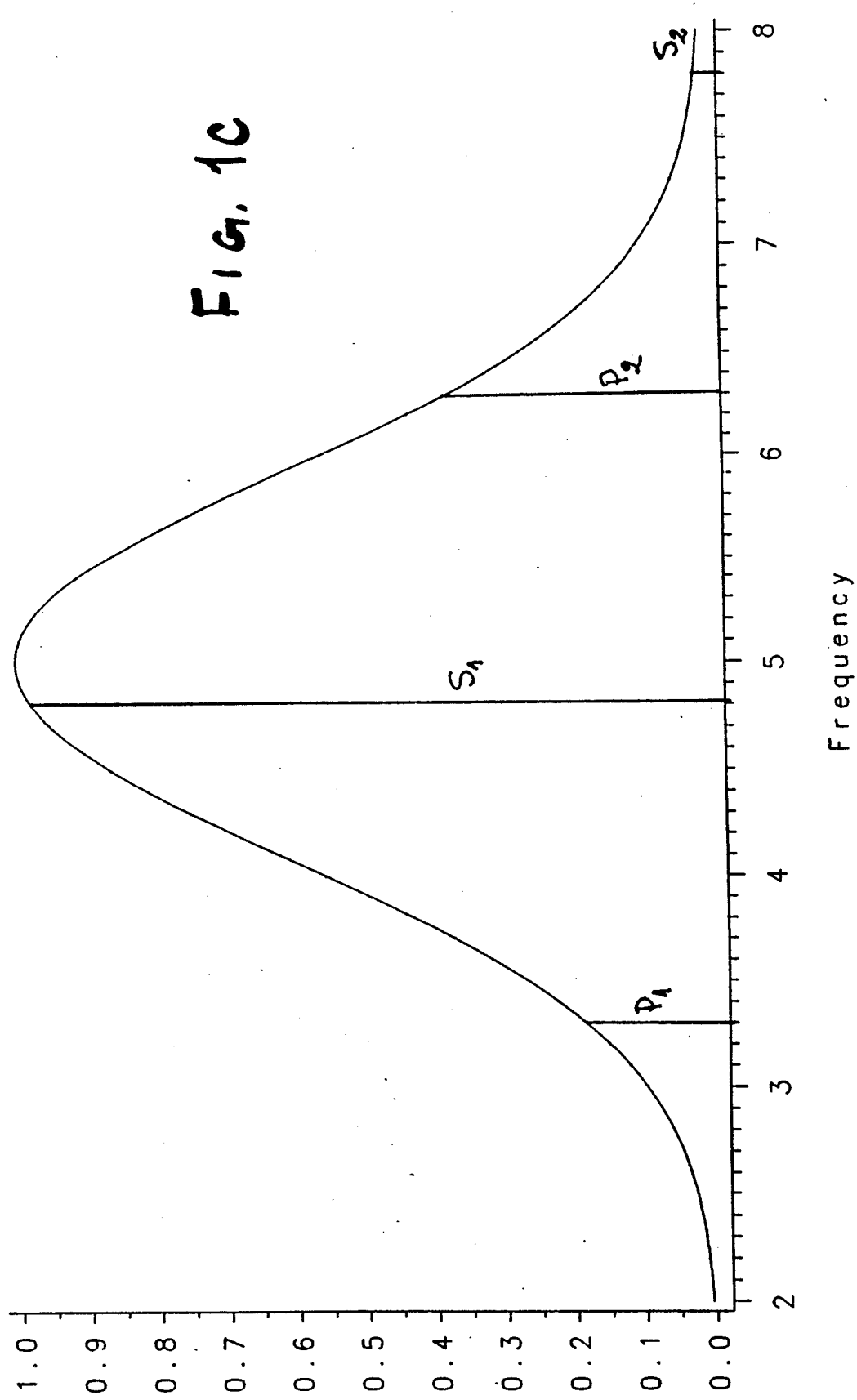

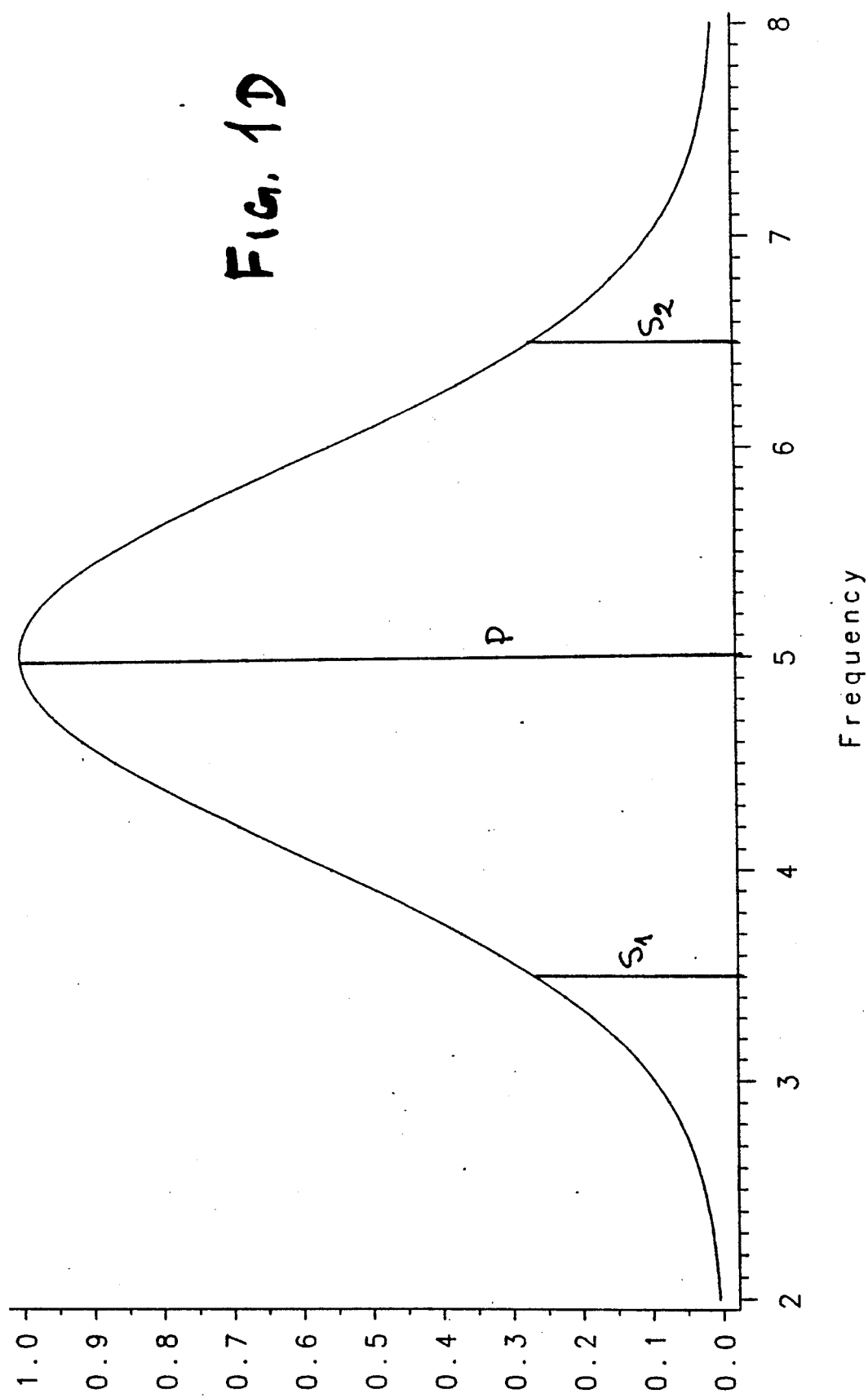

INTERFEROMETRIC MEASUREMENT DEVICE WITH NON STABILIZED LIGHT SOURCE

FIELD OF THE INVENTION

The present invention relates to a method and system for greatly extending the effective coherence length of multimode non-stabilized lasers used in interferometric devices, which allows one to construct inexpensive interferometers with large optical path differences based on such lasers. Of particular interest is the application of this method of displacement measurement interferometry.

BACKGROUND OF THE INVENTION

Accurate measurement devices are needed by modern manufacturing facilities where the machining accuracy approaches several microns per meter so that the accuracy of the measuring devices for inspection and control must be in the sub-micron range. Among the existing measuring systems only interferometers can provide such accuracies over extended ranges (up to and beyond 1 meter). Other systems suffer either from limited accuracy or from limited range. Most commercial interferometers, which are capable of measuring ranges up to and above 10 meters and of accuracies of 0.1 $\mu$m/m or better, are based on stabilized lasers and are too delicate or too expensive to be used widely on the factory floor or be incorporated in systems for closed-loop motion control. Interferometers based on non-stabilized lasers, on the other hand, have a very limited measuring range.

The main obstacle to the use of non-stabilized lasers in displacement measuring interferometry (and in unequal-path interferometers in general) is their limited coherence length and, hence, limited measuring range. This is caused by simultaneous presence of several resonating cavity modes in laser emission (mode competition). Each of the modes forms its own interference fringe system, and these systems are shifted with respect to each other in accordance with the frequency difference between the modes and with the measured path length. The optical signal arriving at the detection system of an interferometer carries the interference fringe systems associated with each mode and, thus, can be regarded as "encoded" with the optical signals of the individual modes. The interference systems of different modes overlap incoherently because of a very large frequency difference between the modes compared with the frequency response of the detectors. Therefore, the fringe picture observed by the detection system is a sum of the fringe intensities of all the modes present, and the "encoded" information pertaining to the individual modes is lost.

Consider, for clarity, a short-tube laser which emits most of the time in two modes. The frequency spacing of the modes is c/2L, where L is the tube length of the laser. (This is illustrated in FIG. 1a, where the $P_2$ mode is, typically, below the gain threshold and does not participate in emission). If the optical path difference in the interferometer is equal to the tube length, then the fringe pictures of the two modes at detection are exactly in antiphase. This will be observed as a fringe picture of the stronger mode with fringe contrast reduced by the contamination by the second mode. If, in addition, the intensities of the modes are equal (FIG. 1b), then the loss of contrast will be complete. The intensities of the modes depend on their relative positions under the Doppler profile of the laser emission line (FIG. 1) and, in turn, on the laser tube length, and they fluctuate with inevitable fluctuations of the latter caused mainly by temperature variations. Thus, when the optical path difference approaches the tube length (i.e., when the displacement to be measured approaches its half) and the fringe systems of the two modes are in antiphase, partial loss of contrast will be observed and the contrast will fluctuate with time between almost 100% in the case of FIG. 1a and zero in the case of FIG. 1b. The coherence length of such a laser is equal, therefore, to its tube length.

In general, the coherence length of a multimode non-stabilized laser is 2L/m, where m is the number of modes, and in practice measuring ranges for, say, HeNe lasers, are only of the order 100 mm.

SUMMARY OF THE INVENTION

The present invention relates to a method for greatly extending the effective coherence length of a two-mode non-stabilized laser in a two-beam interferometer based on decoding of the individual optical signals pertaining to the fringe systems of the individual modes and utilization of the stronger signal for fringe counting. We refer to this method as a method of "count switching," since the counting of fringes is switched from one mode to another whenever necessary. This method allows one to build inexpensive interferometers with extended optical path differences which are equivalent to that of stabilized lasers (greatly exceeding the laser tube length) and are limited theoretically only by the width of an individual mode. An additional advantage of the count-switching interferometer is its improved accuracy compared with conventional systems. The method is directly applicable to multimode lasers as well.

DRAWINGS

FIGS. 1a, 1b, 1c are graphs which illustrate the mode competition and mode drift with changes of the laser tube length.

DETAILED DESCRIPTION OF THE INVENTION

The present invention relates to a method and system for greatly extending the effective coherence length of non-stabilized lasers used in two-beam interferometric devices. The method is first described for a two-mode laser and then is extended to multimode lasers.

The method, which is the subject of the present invention, is designed to overcome the mode competition problem referred to above and amounts to separation of the fringe systems of the two modes in the total interferometric signal prior to detection (decoding of the individual mode signals in the total signal) and use of the stronger mode for fringe counting. As a result, there is no contamination of the fringe picture by that of the second mode (and, hence, no loss of contrast), and the intensity of the mode used for counting is always above a certain minimum. Therefore, the effective coherence length of the laser in the interferometer is greatly increased. In addition, there is a significant increase of accuracy compared with a conventional interferometer using a non-stabilized laser.

Figure 2:
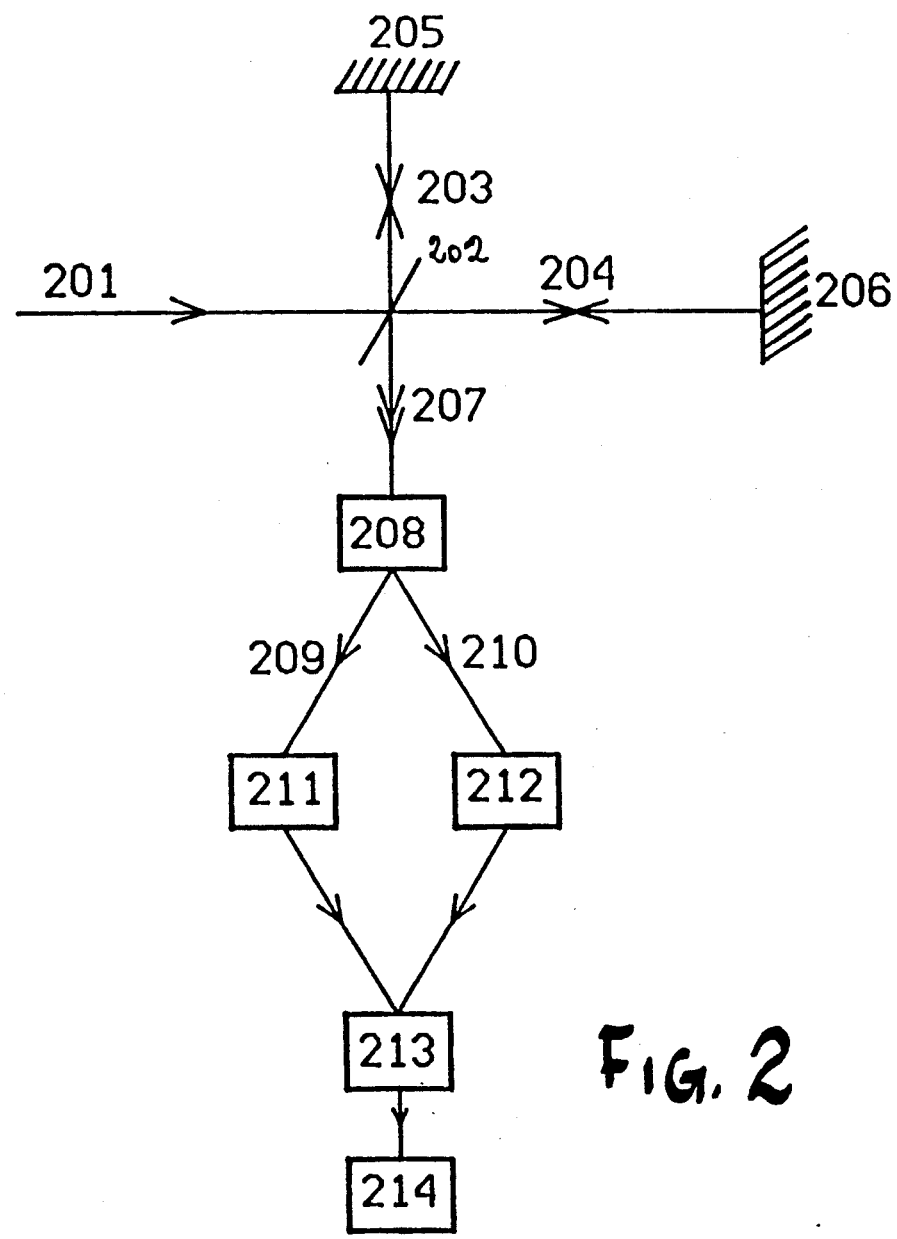
FIG. 2 is a block diagram of a count switching interferometer with mode separation at detection.

A block diagram illustrating the present invention is shown in FIG. 2 for the Michelson-type optical arrangement. There, (201) is the beam emitted by a two-mode non-stabilized laser; (202) is a beamsplitter separating the original laser beam into two beams: a reference beam (203) and a measuring beam (204); (205) and (206) are mirrors which reflect the beams (203) and (204) in order to recombine them in the interference beam (207); (208) is a mode separating component, which splits the interference beam (207) into two beams (209) and (210) each carrying the interference picture of a separate individual mode; (211) and (212) are electro-optical counting detectors producing fringe counts for each mode whenever possible; and (213) is the mode selector, which passes the counts of the optimum mode to the main counter (214).

In general, decoding (separation of the signals of the individual modes at detection) can be made on the basis of polarization, wave length, or any other observable characteristic of the beam.

Polarization separation of the modes takes advantage of the fact that the two modes of a two-mode non-polarized laser are polarized in orthogonal directions. Theoretically, the directions of the two polarizations are set randomly with switching on of the laser. In practice, however, because of inevitable anisotropy of the resonating cavity, no matter how small, these directions are always the same for a given tube and can be measured once and for all, and thus provide the basis for mode separation. For example, a polarizing beamsplitter inserted in the path of the laser beam can be oriented in such a way (or, equivalently, given the orientation of the polarizing beamsplitter, the laser can be rotated around its axis) that the polarization directions of the beamsplitter are parallel to those of the laser modes and, thus, each of the beams contains a different mode.

In wave length separation one can make use of the fact that the wave length spacing of the modes in a laser is $\Delta\lambda = \lambda^2/(2L)$, where $\lambda$ is the mean wave length and $L$ is the length of the laser tube. This can be utilized, in principle, by means of any instrument used in high-resolution spectroscopy, such as a diffraction grating, where each wave length is deflected by a different angle and, say, split apertures are used to select the mode in the center (FIG. 1a) and the off-center modes (FIG. 1b). It is equally possibly to use Fabry-Perot etalons with appropriate finesse, tuned so as to transmit the central wavelength (FIG. 1a) and the off-center wavelengths (FIG. 1b).

In principle, mode separation can also be based on any other observable characteristic of the beam. For instance, it is possible to modulate the modes emitted from the laser in polarization, intensity, or amplitude, and separate the modes at detection by appropriate electronic demodulation.

Because of the frequency (and wave length) difference between the modes, there is a change in the number of wave lengths per optical path difference and, hence, there is a "phase shift" between the fringe systems of the two modes, which, if uncorrected, would result in a discontinuous change in counting at the switching moment. For instance, in the problematic half-tube-length point this phase shift is 180° and there is ½ pulse gained (or lost) at the switching moment. With fluctuations of the laser tube length the count will be switched back and forth between the two modes and this discontinuity error can conceivably accumulate. However, since at the moment of count switching the intensities of the two modes are almost equal and both detection systems, (211) and (212) are able to produce counts, this relative "phase shift" between the modes at the switching moment can be determined easily and a count correcting difference can be added to the total number of pulses in the main counter (214), thus eliminating the above discontinuity. In fact, the count discontinuity is equal to the fractional part of $D/(2L)$, where $L$ is the tube length and $D$ is the optical path difference between the two interferometer beams.

Referring, for illustration to FIG. 1, in the case of FIG. 1a the S mode lies close to the center of the Doppler emission profile, is much stronger than the other mode, and is, therefore, chosen for counting. With temperature fluctuations, the modes drift (say, to the left) and may become comparable in intensity (FIG. 1b). With further drift, the P mode will become stronger than the S mode and the count will be switched to that mode. If the drift continues in the same direction, eventually the original S mode will travel outside the limits of the Doppler curve (and will go to extinction) and another S mode will enter the confines of the Doppler curve from the right, etc.

The accuracy of the count switching interferometer is limited by the maximum variation of the wave length of the mode used for counting, i.e., by the maximum deviation of the wave length of a mode from the wave length corresponding to the center of the emission line. Clearly, this deviation cannot exceed half the spacing between the modes, so that the relative accuracy is better than $\lambda/(4L)$, i.e., $10^{-6}$. This is already a significant improvement over a conventional interferometer with a non-stabilized laser where the variation of the wave length of a mode is limited by the Doppler curve itself. However, since in the situation (FIG. 1b) where the mode deviation is the largest both modes are present and able to produce counts, it is possible to average the counts in the S and P modes in order to reduce the wave length uncertainty even further.

The method of count switching can also be applied to three-mode lasers and to multimode lasers in general, either on the basis of wavelength decoding or polarization decoding. In the latter case one makes use of the fact that the polarizations of the neighboring modes are orthogonal. The only difference here from the two-mode case is that the fringe picture obtained for a given polarization will contain the signals of all the modes characterized by that polarization. However, since the spacing between the modes having the same polarization in a non-polarized laser is relatively large (twice the mode spacing), the resulting fringe picture in a given polarization will be observed as the fringe picture of the strongest mode with a small loss of contrast caused by the presence of the other modes. For instance, in the case of a three-mode laser, if one of the modes is close to the center of the Doppler curve (the $S_1$ mode in FIG. 1c), its fringe picture will be contaminated by that of the $S_2$ mode. However, the intensity of the $S_2$ mode is considerably smaller than that of the $S_1$ mode so that its effect on the fringe contrast will be minimal. In the case where the intensities of two S modes are comparable (FIG. 1d), it is the P mode that will be the strongest and used for counting. The maximum number of modes that can be accomodated by the method of count switching with the polarization technique depends on the exact shape of the emission profile and can exceed four. Note that because of a smaller mode spacing there is a corresponding gain in accuracy compared with shorter tubes.

The method of count switching is not limited to the Twyman-Green optical scheme and can be applied to any two-beam interferometer with a non-stabilized laser where it is desirable to extend the optical path difference in the two beams.

EXAMPLES

Figure 3:
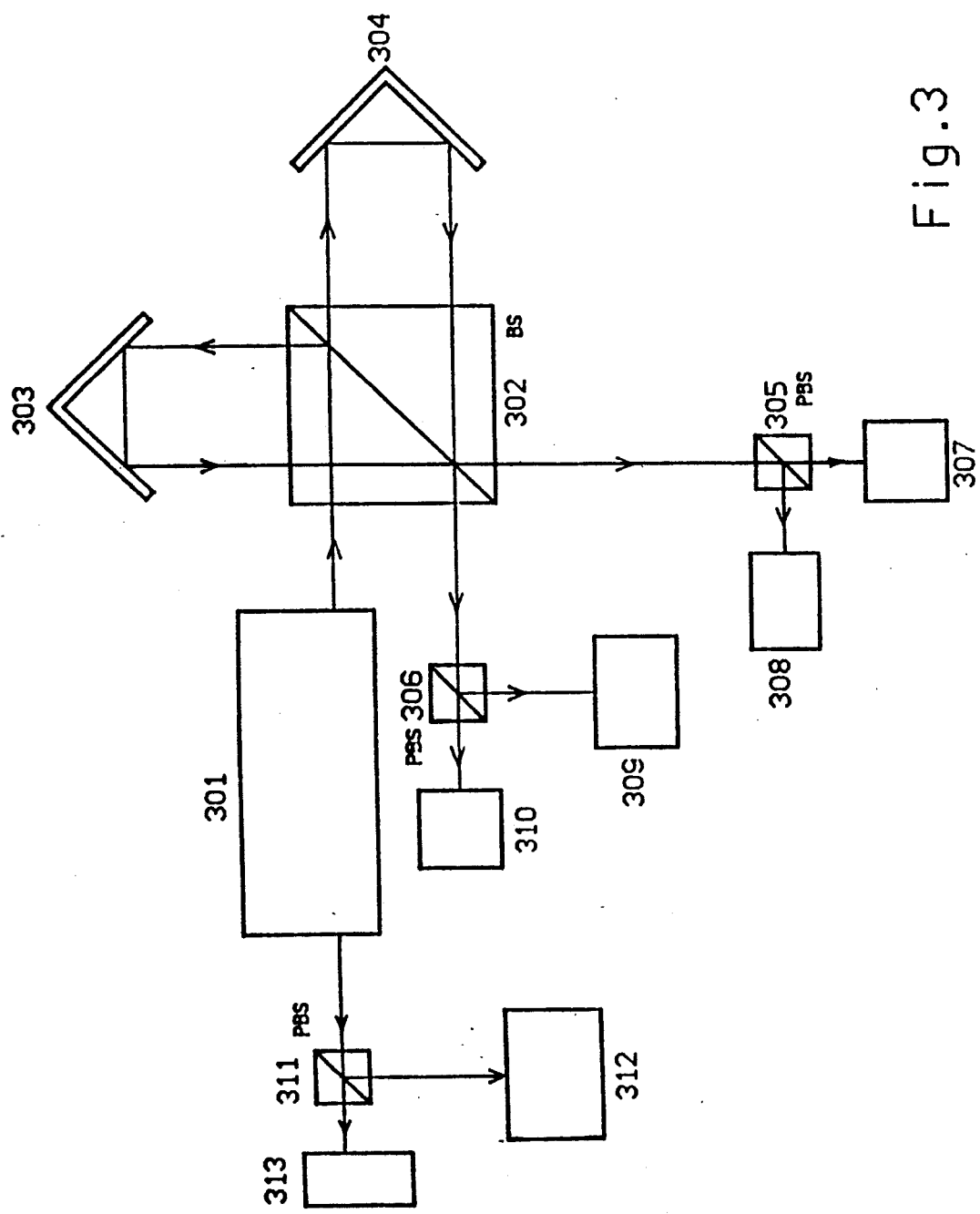
FIG. 3 is an optical scheme of an embodiment of the count switching interferometer with polarization mode separation at detection.
Figure 4:
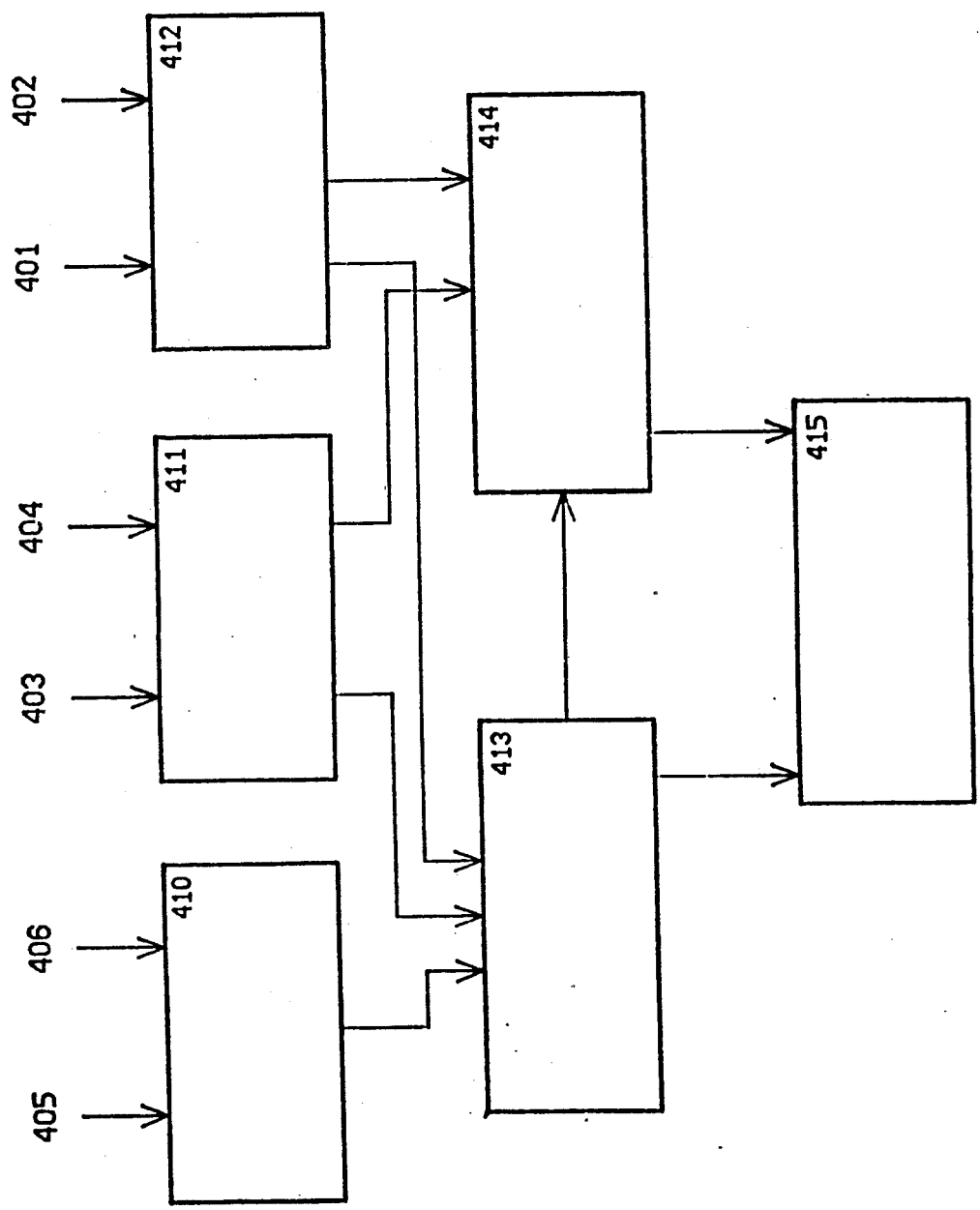
FIG. 4 is a block diagram of the count-switching electronics.

A preferred embodiment of the present invention is illustrated in FIGS. 3 and 4, implementing the method of count switching with polarization separation of the modes for a Twyman-Green interferometer for measurement of displacement. The optical scheme is illustrated in FIG. 3 where: (301) is a short-tube gas laser such as one having the 7647 HeNe tube by Siemens; (302) is a "main" beamsplitter separating the main laser beam into a refernce beam and a measuring beam; (303) is a retroreflector for the reference beam, which is fixed relative to the main beamsplitter (302); (304) is a remote retroreflector in the measuring path, whose movement defines the displacement to be measured [the beamsplitter (302) is taken to be not polarizing and, therefore, the reference beam and the measuring beam each contain both polarizations]; (305) and (306) are polarizing beamsplitters in the paths of the two recombined beams emerging from the main beamsplitter (302), each carrying a combined interference fringe picture; (307)-(310) are photodetectors (such as PIN photodiodes) for registration of the intensity of fringe signals; (311) is an additional polarizing beamsplitter inserted in the path of the beam emitted from the back mirror of the laser (rather than splitting off a part of the main beam); and (312) and (313) are two additional photodetectors. The main beamsplitter (302) is advantageously arranged to have absorption so that the interference fringe pictures in the two recombined beams [which enter the polarizing beamsplitters (305) and (306)] are shifted in phase with respect to each other. The phase shift depends on the amount of absorption and is ideally 90° so that the corresponding signals can be used in quadrature for bidirectional electronic fringe counting.

The polarizing beamsplitters (305), (306), and (311) are oriented so as to separate the two polarizations of the two laser modes, to be called S and P, and there is a photodetector for each polarization in each separated beam. For concreteness, let us assume that the photodetectors (307), (310), and (313) receive the P-polarized component of the beams and that the photodetectors (308), (309), and (312) receive the S-polarized component of the beams. As a result, there are two fringe-counting electro-optical arrangements: the photodetectors (307) and (310) for bidirectional counting in the P-polarized mode, each receiving the P-polarized component of the two recombined beams whose fringe pictures are, as before, shifted in phase by 90° with respect to one another (signals in quadrature), and the photodetectors (308) and (309) for bidirectional counting in the S mode. The photodetectors (312) and (313), which are inserted in the path of the beam emitted from the back mirror of the laser, measure the intensities of the P and S modes, and their signals are used for controlling the switching of counting to a stronger mode whenever necessary. (It is also possible to control the switching on the basis of the maximum contrast of the fringe signals.) The displacement measured is obtained as a number of pulses multiplied by $\lambda/2$.

A block diagram of an embodiment of the count switching electronics is shown in FIG. 4. There, (401), (402) and (403), (404) are the two signal pairs from the S and P photodetector pairs (308), (309) and (307), (310), with the interference signals in each pair shifted by ~90° relative to each other (in quadrature) as explained above; (411) and (412) are bidirectional counters for the P and S modes; (405) and (406) are the mode intensity signals, which are generated by the photodetectors (312) and (313) and which are fed into the intensity comparator (410); (413) is the mode selector which passes the counts of the stronger mode to the main counter (415) and which generates a mode switching trigger signal to the count corrector (414); finally, the count corrector (414) calculates the count correcting difference and adds it, upon receiving the trigger signal from the mode selector (413), to the total number of pulses in the main counter (415). In order to prevent possible rapid "hopping" of the selector (413) from one mode to another in the case where the intensities of the two modes are approximately equal (as in FIG. 1b), a simple hysteresis rule is imposed in the mode selector (413), effecting the mode switch only after the intensity difference exceeds a certain threshold.

With a slight modification of the electronics, the same arrangement can implement count averaging in order to increase the accuracy in the case of FIG. 1b. Namely, whenever both intensity signals (405) and (406) exceed the required threshold, the counts of the P and S counters (411) and (412) are averaged before passing them to the main counter (415). In this case the mode selector (413) and count corrector (414) deal with three possible situations: S mode alone, P mode alone, and S and P mode averaged, and with two possible count switchings: S←SP and SP→P.

Figure 5:
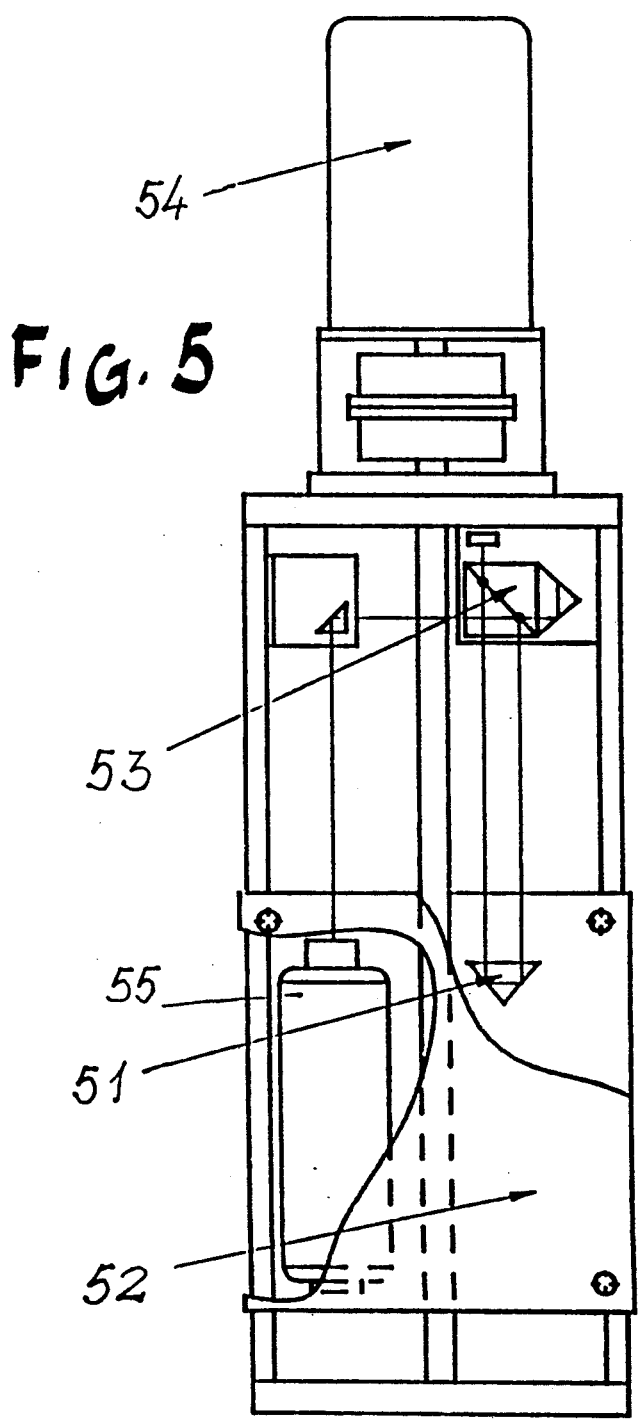
FIG. 5 illustrates the use of the count-switching interferometer as a measuring device in accurate closed-loop control of the motion of a translation stage.

A possible use of the distance measuring interferometer is shown schematically in FIG. 5 which illustrates the use of a count switching interferometer as a displacement resolver for controlling a linear translation stage. There, (51) is a remote retroreflector mounted on the carriage (52) of the translation stage; (55) is the laser; (53) is the rest of the interferometer mounted on the immobile part of the translation stage; and (54) is a motion actuator servo-controlled on the basis of the signal generated by the interferometer (53).

We have built a prototype device shown in FIG. 5 implementing the optical scheme in FIG. 3 and having the count switching electronics as in FIG. 4. The device was based on the 7647 laser tube by Siemens and has a measuring range of 800 mm. The measuring accuracy is, as tested versus a 5ZL150 interferometer by Spindler and Hoyer, $1\mu$ per meter. But constrast, if the same device is operated as a conventional interferometer without count switching, then the measuring accuracy falls to ~$2.5\mu$ per meter, and the measuring range is reduced more than 10 times. Viz., when the measuring range approaches ~75 mm, the fringe constrast disappears (and reappears) periodically, as indeed should be expected from theoretical considerations.

I claim:
1. A method of greatly increasing the effective coherence length of multimode non-stablized lasers in two-beam interferometric devices, comprising the steps of: decoding the total interferometric signal so as to separate the individual fringe signals of the laser modes after interference and before detection; choosing the optimal signal for counting; switching whenever necessary fringe counting to the optimal individual signal in accordance with appropriate optimization criteria; and adjusting the count after switching according to the wave length of the specific mode used for counting.

2. A method according to claim 1, where the separation of the signals of the individual laser modes is based on polarization, wave length, or other observable mode characteristic.

3. A count switching interferometer with extended measuring range for carrying out a method for greatly increasing the effective coherence length of multimode, non-stablized lasers in two beam interferometric devices, said count switching interferometer comprising a non-stablized short-tube, two-mode gas laser with the two modes having orthogonal polarizations, non-polarizing optical means for dividing and recombining the laser beam produced interference patterns in each of the polarization, electronical means for detecting said interference patterns and for bidirectional counting of the corresponding pulses, polarizing means for optical separation of said individual interference patterns prior to detection, electronical means for choosing the signal producing the optimal interference pattern and switching the counting to the optimal signal, electronical means for correcting the count at the moment of count switching, and electronical means for calculating the displacement on the basis of said bidirectional counts.

4. The count switching interferometer as in claim 3, where the count correction system includes the means for count averaging in the two polarizations in the situation where both signals are present in order to improve the accuracy.

5. The count switching interferometer as in claim 3, where the non-polarized laser emits in three or more modes.

6. The count switching interferometer as in claim 3, where the optical scheme is based on the Twyman-Green scheme.

7. The count switching interferometer as in claim 3, where the optical scheme pertains to other two-beam interferometers.

8. The count switching interferometer as in claim 3, where the optical separation of the modes is based on polarization, wavelength, or other charactertic of the modes.

9. A displacement measuring device, comprising:
a count switching interferometer, said count switching interferometer including:

a non-stablized short-tube, two-mode gas laser with the two modes having orthogonal polarizations, non-polarizing optical means for dividing and recombining the laser beam produced interference patterns in each of the polarization, electronical means for detecting said interference patterns and for bidirectional counting of the corresponding pulses, polarizing means for optical separation of said individual interference patterns prior to detection, electronical means for choosing the signal producing the optimal interference pattern and switching the counting to the optimal signal, electronical means for correcting the count at the moment of count switching, and electronical means for calculating the displacement on the basis of said bidirectional counts; and, means for determining a change in the optical path difference in the two interferometer beams with said displacement being so defined by said change.

10. The displacement measuring device as in claim 9, further comprising means for converting a rotational movement into a linear movement for high accuracy measurement of extended rotational displacements.

11. The displacement measuring device as in claim 9, further comprising means for converting a non-linear movement into a linear movement for a high accuracy measurement of extended non-linear displacements.

12. A measuring device, comprising:
a count switching interferometer, said count switching interferometer including:
a non-stabilized short-tube, two-mode gas laser with the two modes having orthogonal polarizations, non-polarizing optical means for dividing and recombining the laser beam produced interference patterns in each of the polarization, electronical means for detecting said interference patterns and for bidirectional counting of the corresponding pulses, polarizing means for optical separation of said individual interference patterns prior to detection, electronical means for choosing the signal producing the optimal interference pattern and switching the counting to the optimal signal, electronical means for correcting the count at the moment of count switching, and electronical means for calculating the displacement on the basis of said bidirectional counts; and, means for determining a change in the optical path difference in the two interferometer beams for determining the quantity to be measured.

* * * * *